No. 640,665. Patented Jan. 2, 1900.
J. D. KING.
FILTER.
(Application filed Oct. 19, 1899.)
(No Model.)
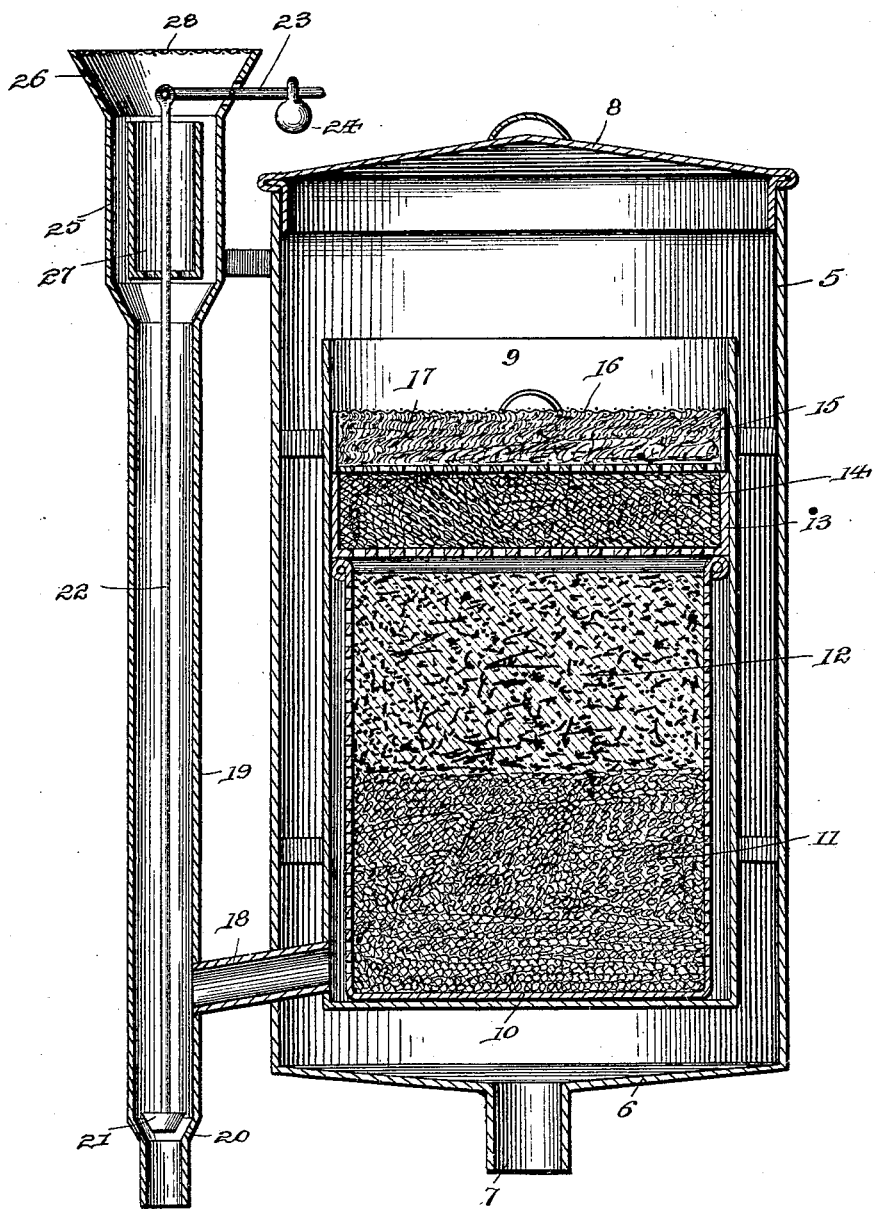
Witnesses
F. E. Alden
Geo. H. Chandler
John D. King. Inventor
By his Attorneys,
C. A. Snow & Co.

UNITED STATES PATENT OFFICE.

JOHN D. KING, OF MOUNT STERLING, KENTUCKY, ASSIGNOR, BY MESNE ASSIGNMENTS, OF ONE-HALF TO JAMES A. SHIRLEY, OF SAME PLACE.

FILTER.

SPECIFICATION forming part of Letters Patent No. 640,665, dated January 2, 1900.

Application filed October 19, 1899. Serial No. 734,080. (No model.)

*To all whom it may concern:*

Be it known that I, JOHN D. KING, a citizen of the United States, residing at Mount Sterling, in the county of Montgomery and State of Kentucky, have invented a new and useful Filter, of which the following is a specification.

This invention relates to filters in general, and more particularly to that class employed in connection with cisterns; and it has for its object to provide a construction in which the filtering material will normally be drained and in which when the flow of water to the filter begins the drain will be closed, so that the water will pass through the filter to the cistern or other receptacle.

A further object of the invention is to provide a filter in which the filtering material will be automatically cleansed and in which all moisture will be drained away to prevent freezing.

In the drawing forming a portion of this specification there is shown a central vertical section taken through the filter and the automatic drain apparatus.

Referring now to the drawing, 5 represents the casing of the filter, which may be cylindrical in form, as shown, and of galvanized iron or other suitable material, the lower end 6 being depressed centrally to insure the flow of water from the casing through the outlet-pipe 7. A suitable cover 8 is removably placed upon the upper end of the casing 5.

Supported within the casing 5 and centrally thereof is a cylindrical vessel 9, the lower end of which is closed and within which is disposed a foraminous receptacle 10, which rests upon the bottom of the vessel. In this receptacle 10 and at the bottom thereof is placed a layer of gravel 11, and above this gravel is placed finely-divided charcoal 12. The upper end of the receptacle 10 fits snugly within the vessel 9 with a water-tight joint, and upon the upper end of the receptacle 10 is placed a second receptacle 13, which fits closely within the vessel 9 and has a filling 14 of gravel. The bottom of this receptacle 13 is perforated, as shown.

Above the receptacle 13 and resting upon the upper edge thereof is a topmost receptacle 15, the bottom of which is perforated and which has a wire-gauze cover 16, beneath which is placed sponge 17.

An inlet-pipe 18 passes through the side of the casing 5 and through the side of the vessel 9, just above the bottom of the latter, to permit the flow of water into the vessel. The water then flows upwardly through the materials in the different receptacles and then outwardly over the top edge of the vessel 9 and passes outwardly into the casing 5, from which it runs through the outlet-pipe 7.

Communicating with the inlet-pipe 18 is a stand-pipe 19, having a valve-seat 20 adjacent its lower end, and into which stand-pipe the pipe 18 opens above the valve-seat. A valve 21 is disposed to enter the seat 20 and has a rod 22, which extends upwardly and through the stand-pipe to a point just below the upper end thereof, where it is connected with a lever 23, pivoted to the stand-pipe and provided with a movable weight 24. The upper end of the stand-pipe 19, through which the rod 22 passes, is enlarged, as shown at 25, and the upper extremity 26 is flared or funnel-shaped, the lever 23 being passed through a slot in the side of this flared portion and pivoted thereto.

Arranged within the enlarged portion 25 of the stand-pipe and concentric therewith is a bucket 27, through which the valve-rod 22 is passed and to which rod the bucket is firmly secured. The lower end of the bucket is perforated, as shown.

The operation of the mechanism is as follows: The weight 24 being properly positioned to be overbalanced by the weight of the water at a predetermined height in the bucket 27, the water falling upon the screen-cover 28 of the flared portion 26 passes inwardly and into the bucket 27. The perforations in the bottom of the bucket are of such a size as to permit only a gradual flow of water from the bucket, and thus the bucket will fill under a very slight flow of water. As soon as the water in the bucket has reached a predetermined height, the bucket moves downwardly and seats the valve 21 in the seat 20, thus cutting off the flow of water through the lower end of the stand-pipe, which is opened normally, the water accumulating in the stand-pipe and passing therefrom inwardly and upwardly through the filtering material into the casing 5, and thence outwardly through the drain-pipe 7. When the flow of water to the bucket 27 ceases, the bucket empties itself, when the weight 24 raises the valve 21 and opens the lower end of the stand-pipe, so that all water is drained from the stand-pipe and from the filter, and hence no freezing can occur.

It will be understood that in practice the specific construction and arrangement shown may be varied and that any desired material may be employed without departing from the spirit of the invention.

What is claimed is—

1. In a filter, the combination with a casing having an outlet at the lower end thereof, of a vessel disposed within and concentric with the casing and separated from the walls thereof by an interspace, a foraminous receptacle within the vessel and separated therefrom by an interspace extending part way of its height, said receptacle having a sill at its upper edge between it and the vessel, additional receptacles above the first-named receptacle, filtering materials in the several receptacles, an inlet-pipe passed through the walls of the casing and communicating with the interspace between the vessel and the first-named receptacle adjacent the lower end of the latter, a stand-pipe connected with the inlet-pipe, an outlet-valve in the stand-pipe below the inlet-pipe, a rod connected with the valve and extending upwardly through the stand-pipe, and a perforated bucket fixed to the rod and adapted to receive water in its passage to the stand-pipe, to close the valve.

2. In a filter, the combination with a casing, of a vessel disposed therein and separated from the walls thereof by an interspace, a foraminous receptacle disposed within the vessel and separated from the walls thereof by an interspace extending part way of the height of the receptacle, a sill between the upper portion of the receptacle and the wall of the vessel, filtering materials within the receptacle, an inlet-pipe passed through the wall of the casing and into the vessel adjacent the bottom thereof, a stand-pipe connected with the inlet-pipe, an outlet-valve in the stand-pipe below the inlet-pipe, a rod connected with the valve and extending upwardly through the stand-pipe, a lever pivoted to the stand-pipe and to the rod, a weight upon the lever and adjustable thereon to vary its counterbalancing effect, and a perforated bucket upon the rod and adapted to receive water in its passage to the stand-pipe, to close the valve.

In testimony that I claim the foregoing as my own I have hereto affixed my signature in the presence of two witnesses.

JOHN D. KING.

Witnesses:
JAMES BURKE,
JOHN S. SMITH.